(12) United States Patent
Zmood

(10) Patent No.: US 7,434,737 B2
(45) Date of Patent: Oct. 14, 2008

(54) MEMORY DEVICES

(75) Inventor: Ronald Barry Zmood, Caulfield North (AU)

(73) Assignee: Mems-Id Pty Ltd., Melbourne (AU)

( * ) Notice: Subject to any disclaimer, the term of this patent is extended or adjusted under 35 U.S.C. 154(b) by 244 days.

(21) Appl. No.: 10/549,190

(22) PCT Filed: Mar. 17, 2004

(86) PCT No.: PCT/AU2004/000322

§ 371 (c)(1),
(2), (4) Date: Nov. 14, 2005

(87) PCT Pub. No.: WO2004/084131

PCT Pub. Date: Sep. 30, 2004

(65) Prior Publication Data

US 2006/0151613 A1   Jul. 13, 2006

(30) Foreign Application Priority Data

Mar. 17, 2003   (AU) .............................. 2003901240

(51) Int. Cl.
*G06K 19/06* (2006.01)
(52) U.S. Cl. ................. 235/492; 235/435; 235/487
(58) Field of Classification Search ................. 235/435, 235/439, 449, 451, 487, 492, 493; 73/862.59, 73/462.59
See application file for complete search history.

(56) References Cited

U.S. PATENT DOCUMENTS 3,967,161 A   6/1976   Lichtblau
(Continued)

FOREIGN PATENT DOCUMENTS

DE   10251389 A1 *  6/2003
(Continued)

OTHER PUBLICATIONS

Wang et al., "Frequency Trimming and Q-Factor Enhancement of Micromechanical Resonators Via Localized Filament Annealing," Transducers '97, 109-11, IEEE (1997).
(Continued)

*Primary Examiner*—Seung H Lee
(74) *Attorney, Agent, or Firm*—Oliff & Berridge, PLC

(57) ABSTRACT

A passive memory device includes a plurality of resonant members, e.g. of a cantilever or bridge-type form, that may have different resonant frequencies and that may be held against vibrations by end or side tethers. Data may be recorded in the device by removing various of the tethers, so that, on applying an excitation signal, e.g. from a transmitter, untethered resonant members vibrate strongly in response to their resonant frequencies, and provide a response signal that can be picked up e.g. by a receiver and correlated with the excitation signal frequencies to determine which resonant members have been untethered. The response by an untethered resonant member can correspond to a logical "1", whilst the lack of a response signal at a known resonant member frequency can correspond to a logical "0", or vice versa. The device may be made using MEMS technology, and various device structures and excitation/detection methods are disclosed including the use of excitation/detection circuitry within the device and the use of magnetic, Lorentz, electrostatic and/or piezoelectric forces.

27 Claims, 7 Drawing Sheets

U.S. PATENT DOCUMENTS

| | | | |
|---|---|---|---|
| 4,510,490 A | | 4/1985 | Anderson, III et al. |
| 5,165,289 A | * | 11/1992 | Tilmans .................. 73/862.59 |
| 5,420,569 A | | 5/1995 | Dames et al. |
| 5,481,102 A | * | 1/1996 | Hazelrigg, Jr. .............. 235/487 |
| 5,552,778 A | | 9/1996 | Schrott et al. |
| 5,563,583 A | | 10/1996 | Brady et al. |
| 5,565,847 A | | 10/1996 | Gambino et al. |
| 5,812,065 A | | 9/1998 | Schrott et al. |
| 6,060,815 A | | 5/2000 | Nysen |
| 6,819,246 B1 | | 11/2004 | Seppa |

FOREIGN PATENT DOCUMENTS

| | | | |
|---|---|---|---|
| GB | 2 149 275 A | 6/1985 | |
| JP | A-08-293012 | 5/1996 | |

OTHER PUBLICATIONS

Cleland et al., "Fabrication of High Frequency Nanometer Scale Mechanical Resonators from Bulk Si Crystals," 69 Appl. Phys. Lett., 2653-2655, (Oct. 28, 1996).

Greywall, "Micromechanical RF Filters Excited by the Lorentz Force," J. Micromech. Microeng. 9 78-84 (1999).

Cleland, "Foundations of Nanomechanics From Solid-State Theory to Device Applications," Oct. 18, 2002, Springer Verlag, pp. 303-319, and 426-427 (footnotes).

Elwenspoek et al., "Mechanical Microsensors," Jan. 12, 2001, 1st Ed., Springer Verlag, pp. 121-126, 257-258, and 279, 280 and 286 (footnotes).

* cited by examiner

MEMORY DEVICES

The present invention relates to memory devices, to systems using such memory devices, and to methods of fabricating such devices. It relates to data carriers in general, and relates particularly, though not exclusively, to memory devices that can be used as identification devices, for example in the field of radio frequency identification (RFID).

In many situations, such as in stock control and in the tracking and monitoring of goods and the like, it is important to be able to identify an object quickly and simply.

One method of achieving this identification is to use a barcode. Barcodes comprise labels of thick and thin dark lines that encode information and are read optically, e.g. by a scanning laser beam. They have achieved wide-spread popularity, and are inexpensive and simple to use.

Barcodes do however have shortcomings. For example, as they must be read optically, care must be taken to ensure that they are visible to a barcode reader and that they are oriented correctly with respect to the reader. Also, there are limits as to the amount of information that a barcode label can encode.

Radio frequency identification tags (RFID tags) have recently acquired some popularity. These devices include a microprocessor, an antenna and associated circuitry. A reader also having an antenna communicates with the RFID device via radio signals, and can interrogate the data held within the microprocessor.

These devices do not have the line-of-sight problems associated with barcodes, and can carry significantly more information than barcodes. However, even with modern day fabrication processes, RFID devices are still somewhat expensive, and this can limit their usefulness in many situations.

The present invention provides a novel memory device/data carrier that may for example be used in one embodiment as an alternative type of identification tag, such as an RFID tag.

Viewed from one aspect, the present invention provides a memory device including a plurality of resonant members that are held against vibration by restraining elements, the restraining elements being able to be disabled so as to allow associated resonant members to vibrate in response to an applied excitation signal in order to represent data.

Thus, data/information may be stored/programmed in the memory device by disabling a suitable number of the restraining elements, so that particular ones of the resonant members are able to vibrate. Detection of which of the resonant members vibrate in response to an excitation signal can then reproduce the data/information. For example, each resonant element may correspond to a "1" or "0" depending on whether or not it can vibrate freely, thereby providing binary coding.

The present invention provides a device that may be fabricated simply and inexpensively. For example, the resonant members may be cantilevers or beams that may be fabricated using e.g. MEMS technology, and the restraining elements may be formed as removable tethers that may be disabled by being fused or ablated.

The present invention may provide an identification tag that is less expensive than current RFID devices, whilst still providing non-line-of-sight reading. It can be seen from one view as a non-line-of-sight barcode that allows for remote monitoring, and from another view as a chipless RFID device. It may be used in many different situations, and, due to its low cost, is especially useful in the monitoring of high-volume, low-cost products.

The device may take on a compact and robust form, e.g. on a silicon substrate or the like, which facilitates the mounting of the device in a simple and unobtrusive manner. It may for example be attached directly to an item to be identified or may be applied to associated packaging or the like.

The device can also be designed without the need for an internal power source, as the excitation signal can carry out the required work. This facilitates small and inexpensive designs that do not need batteries, nor necessarily the energization coils of previous passive RFID devices, and can provide tags of long lifetimes.

Further, the present device may carry more information than a barcode. For example, possible embodiments might include 10,000 resonant members corresponding to 10,000 bits of information on a 1 $mm^2$ piece of silicon. Thus, not only identification information can be recorded, but also or alternatively, data as to the attributes of an object or how an object should be handled in an automated process, or any other useful information could be recorded.

Indeed, the memory device is not limited to an identification tag for an object or person, but could be used in many different situations to carry many different types of information.

In one preferred embodiment, the resonant members are cantilever-type members. In another preferred form, they are bridge-type members, e.g. beams that are attached/held against movement at both ends. Any other suitable form or combination of forms would also be possible, and it would for example be possible to utilise resonant members that have no attachment to an underlying substrate (when freed to vibrate), but e.g. are kept in position in a well or other movement limiting structure.

The device preferably utilises resonant members that have different resonant frequencies from one another, so as to distinguish which resonant members are free to vibrate by detecting the presence of vibrations at these different frequencies. It would also be possible to use resonant members having the same resonant frequencies, and to detect e.g. the magnitude of a response signal to determine how many resonant members are free to vibrate. This would however not provide the degree of information that can be encoded by using resonant members of differing resonant frequencies.

Different resonant frequencies may be provided by fabricating the resonant members to have different dimensions, e.g. lengths, widths and/or thicknesses, and/or by using different materials for the members, e.g. denser or lighter materials.

In one preferred embodiment, the restraining elements are tethers that are disabled through their removal. A tether may for example be fusible, so that it may be disabled by passing a suitably high current through it to cause it to melt/vaporise. The current could be provided e.g. via contacts that are connectable with an outside power source, or by inductive energization of a coil in the device. The device may include an electrical array of individually addressable contacts so as to be able to free selected ones of the resonant members. The array could for example be a diode matrix array.

Alternatively, or also, the tethers could be removable through ablation, e.g. through a suitable ablating beam, such as an electromagnetic beam, e.g. a laser beam, such as an Excimer laser. This may be achieved e.g. by placing a photo mask over the tag and exposing the tag to Excimer radiation. The photo mask will be patterned so that the tethers of those resonant members that are not to be freed are shielded from the laser beam, whilst the mask has windows therein in locations that correspond to the positions of tethers that are to be removed.

Alternatively, the tethers could be removed individually by a narrowly focussed ablation beam that may be e.g. numerically controlled.

The tethers could also be removable through etching, a mask being used to protect those tethers that are not to be removed. For example, the tethers could be covered by a photo resist and then exposed and etched.

The programming may occur as a final step in a manufacturing routine, and the present invention has the advantage that the same tag construction may be tailored to many different uses by suitable programming in a final restraint disabling, e.g. tether removing, step. The manufacturing process need not therefore be changed for different tags, except in the final step in which e.g. different photo masks may be used. This provides for simple manufacturing of the devices.

The devices may also be field programmed, e.g. using laser ablation or current-fusible tethers. In the latter case, the memory devices may be inserted into writer apparatus that connect with an addressable array in the device to e.g. provide power to suitable junctions of the array and fuse selected ones of the tethers.

One or more tethers may be provided for each resonant member. Tethers may be provided at the ends and/or along one or more sides of the resonant members. For example, a resonant member in the form of a cantilever may have only a single tether at its free end, whilst a bridge-type resonant member may have a pair of tethers positioned in the middle of the member on opposite sides of the member. The use of a bridge type resonant member with side tethers is an especially preferred embodiment.

In one preferred embodiment, the excitation signal may comprise an electromagnetic field. For example, a swept RF signal may be used which passes through the resonant frequencies associated with the resonant members. In other embodiments, white noise or spread spectrum technologies could be used. These could include spread spectrum using pseudo random number (PRN) modulation signals or random "frequency hopping". The excitation signal may take any other suitable form.

The resonant members may be suitably configured to couple with the excitation signal when freed to vibrate, and to provide a suitable response.

The resonant members may be magnetic elements, e.g. they may include permanent magnetic material (e.g. a deposited magnetic film) or could include other suitable magnetic material, such as a soft magnetic material, e.g. Permalloy. The soft magnetic material may couple with a permanent magnet, e.g. on the device, or with a biasing DC magnetic field applied to the device during interrogation, although in preferred embodiments, this is not required.

The resonant members may be vibrated by direct interaction with the excitation signal. Preferably, however, the device includes excitation circuitry associated with the resonant members. For example, the excitation circuitry may include a coil in the device that interacts with an excitation signal to generate a magnetic field that the resonant members then respond to. This may be a single coil for all of the resonant members, although a coil element for each or for a group of the resonating members would also be possible.

In another preferred form, the excitation circuit includes an antenna, e.g. a coil or dipole, and one or more conductors, such that an excitation signal induces an ac current in the circuit to vibrate the resonant members.

Changes in a characteristic of the excitation circuit may be used to determine whether any of the resonant members are vibrating. For example, the impedance of the circuitry may change when a resonant member is vibrating at its resonant frequency.

In one preferred form, the resonant members may be configured such that they move under the Lorentz force (the orthogonal force acting on a charged particle travelling in an electric field). A resonant member may for example be placed in a magnetic field and have an electrical conductor associated with it that has a current induced within it by an excitation signal, so that the conductor experiences a force that is transferred to the resonant member, which will in turn vibrate. If the vibrational force corresponds to the resonant frequency of the resonant member, e.g. the induced current is at the resonant frequency, then the impedance in the circuit containing the conductor will change, and this can be detected.

The magnetic field may be provided, e.g. by a permanent magnet in the device or, during reading, by an external field applied at the same time as an excitation signal. The current in the conductor may be induced through an associated antenna, e.g. a coil that couples with the excitation signal, and the same circuit may be used to detect a change in impedance when one or more of the associated resonant members resonates.

In another embodiment, the resonant members are vibrated by an electrostatic force. For example, a charged resonant member may vibrate under an electrostatic attractive and/or repulsive force with one or more electrodes. In a particularly preferred embodiment, resonant members are provided with an electrode thereon that couples capacitively with a further electrode. The two electrodes may connect with an electric circuit for supplying an ac current thereacross, so that when the ac current frequency corresponds to the resonant frequency of the resonant member, the resonant member vibrates strongly. The further electrode may be fixed or may vibrate also. In the former case, the further electrode may be common to a number of resonant members. The further electrode may be formed on another resonant member, so that the resulting electrode pair can represent two bits of information rather than just one. This can provide for a particularly compact system with a higher density of resonant members.

In a further embodiment, the resonant members are vibrated by a piezoelectric force. For example, each resonant member may have a piezoelectric material provided thereon, with electrodes on opposing sides of the material that connect with a circuit for supplying an ac current thereacross. When a current is applied to the piezoelectric material, the material will strain, e.g. expand and contract, and will cause the resonant member to deflect upwardly or downwardly. When the piezoelectric force corresponds with the resonant frequency of the resonant member, the resonant member will vibrate strongly.

The resonant member may include one or more layers of piezoelectric material, and in one embodiment, the resonant member includes a pair of piezoelectric layers arranged to deflect in opposite directions, e.g. by having their polarisation directions pointing in opposite directions or by applying the current to each layer in opposing polarities.

In one preferred embodiment, that may utilise Lorentz, electrostatic or piezoelectric forces, a plurality of resonant members is associated with a single conductor element that passes over each of them. In a particularly preferred embodiment, the conductor takes a serpentine form with resonant members being provided along its length. This embodiment has the resonant members in a series arrangement. It is also possible, however, to have the resonant members arranged in parallel or in a combination of the two.

The vibration of the resonant members could be detected from signals/disturbances produced directly from the resonant members. Preferably, however, the resonant members have circuitry associated therewith for facilitating the detection of their vibrations. This circuitry may for example comprise the excitation circuitry discussed above, a property of which is altered by the resonant members. Preferably, the impedance or change of impedance of circuitry associated with the resonant members is detected, e.g. through interaction with an interrogation coil in a suitable reader.

In the case of magnetic resonant members, the circuitry may consist of a coil positioned adjacent, e.g. below a resonant member, such that vibration of the member alters the impedance of the coil.

In the case of the Lorentz, electrostatic or piezoelectric resonant members, the impedance of a circuit including the conductors supplying the ac current may be detected.

In a further embodiment, a resonant member could continually open and close an associated circuit when it vibrates, and e.g. the impedance of the circuit could be detected.

Further alternatives include forming the resonant members from electrostrictive or magnetostrictive materials, so that signals/disturbances produced by flexure of the resonating members through these materials may be picked up.

Any suitable number of resonant members may be provided on the device.

As said, the memory device may be used in many different situations, including standard barcode and RFID uses. Uses include stock control, automatic charging of items in shops, tracking of objects or people, and identification of objects, people or animals (or places, e.g. they may be used as location indicators). They may also be used to hold data relating to attributes of an object or person, and/or how they may/should be used or treated. They may be used in electronic article surveillance (EAS) to reduce pilfering and the like, and may be used in e.g. secure access systems, e.g. for a building or room, or as a vehicle door key or the like.

Readers for the memory devices may be hand-held or provided at suitable locations, such as at a shop point-of-sale terminal or at the entrance/exit to a shop or a secure area, and the like. The readers may include suitable excitation signal generators, as well as response detectors, e.g. a coupling antenna, and suitable means for analysing the response and e.g. connecting to suitable databases or central control systems for recording, monitoring or providing further information on the devices.

The data held in the memory devices may be of any suitable type, and any suitable coding system could be used. In one preferred form, the data is stored as logical, binary, data, with the vibrational and non-vibrational states corresponding to logical "1"s or "0"s.

As said, the memory devices may have many applications, and the term "memory device" should accordingly be construed broadly. It should be taken as covering for example data carriers in general, and the device may be considered as a ROM or programmable ROM (PROM) or the like. It should also be taken to cover complete RFID tags.

The device could be made in one embodiment through precision stamping, e.g. using standard precision engineering and plastics moulding techniques. For example, the fabrication process could use suitable foils in the manufacture of the resonant members and restraining elements, such as Permalloy material, as well as e.g. plastics-bonded permanent magnets. Thin foils may be stamped using precision dies and then laminated onto suitable substrates.

In a particularly preferred embodiment, the device is fabricated using MEMS (microelectromechanical systems) technology. Sometimes also known as MST (Micro System Technology) or micromachining.

MEMS technology includes technologies of integrated circuit fabrication, as well as technologies specifically developed for micromachining, and generally relates to the fabrication of components with dimensions in the micrometer to millimeter range.

A MEMS fabrication process typically includes the steps of lithography, e.g. photolithography, thin film deposition or growth, and etching, and typically results in a laminate device. Thus, a number of structural layers may be formed on a substrate, and required components can be formed by selective etching of the substrate and/or sacrificial materials deposited thereon.

The micromachined components may be combined with electronics that are fabricated using standard integrated circuit processes.

The fabrication techniques may include micro-embossing and electroplating, the use of LIGA processing to manufacture micro moulds using plastic injection moulding and electroplating, and/or electromachining (reverse electro-plating) of foil laminates.

A resonant member according to the present invention may be formed on any suitable substrate, e.g. a dielectric or semiconductor substrate, e.g. silicon, glass, ceramic, plastic, Kapton™, cardboard or paper.

The device may be made through fabrication of a resonant member body part on a substrate and etching of the substrate from regions surrounding, e.g. below, the body part.

The restraining element, e.g. tether, may also take any suitable form to allow it to be disabled without damaging the other components of the device. For example it may be made from a material more susceptible to melting or ablation than the resonant member, or more readily made to absorb a laser beam's energy or the like. Preferably, the tether is made of narrower dimensions than the resonant member, so that it will melt or ablate at a lower fusing current or laser power. The tether may be made integrally with the resonant member from the same material.

The substrate on which the resonant member is fabricated may be mounted on a further substrate, e.g. a PCB or a flexible substrate, which may have associated electronics fabricated on it, e.g. an excitation and/or detection coil. Alternatively, the whole device may be fabricated on the same substrate.

Typically, many resonant member devices will be made in a batch fabrication process. They will then be cut out into separate memory devices.

The device is preferably fabricated so that the resonant members vibrate in a vacuum. This facilitates a high quality factor Q, which in turn facilitates a large change in impedance at resonance. It also facilitates the use of resonant frequencies in the range of about 1 MHZ to 2.5+GHZ. The high frequencies facilitate the use of resonant members of small physical size, so as to provide a large number of stored bits or the like.

The device may be provided in any suitable form, and could be a tag or label that can be affixed to an item or its packaging. It could also be built into an object.

In one embodiment, the memory device of the present invention may be used with a temperature-sensing device as taught in the co-pending International (PCT) Patent Application entitled "Temperature Sensing Devices, Systems and Methods" filed on the same day as the present application in the name of the same applicants and claiming priority from Australian provisional application No. 2003901253 filed on 17 Mar. 2003. The contents of this application are incorporated herein by reference. This device uses e.g. a cantilevered member that is restrained from movement by a temperature-sensitive element, such as a magnetic element of appropriate Curie temperature, but that releases the cantilever member to indicate when a temperature threshold has passed. The cantilevered member may be tethered to prevent premature release prior to use. The device could be incorporated into the same substrate as the present memory device to provide a tag giving both information on an item and temperature monitoring of the item.

The present invention relates not only to the memory devices themselves, but also to systems utilising such devices, and, viewed from a further aspect, the present invention provides a data system including a memory device in accordance with any of the above-described embodiments, and an interrogator including a signal generator for applying an interrogation signal to the device and a receiver for receiving a response to the interrogation signal and for analysing the signal in order to determine which of the resonant members in the device vibrate.

The interrogator may apply a swept RF signal to the device, and the receiver may check at which frequencies the device provides a resonant response. Alternatively, the interrogator may apply a white noise signal to the device, or a spread spectrum signal.

The present invention also extends to an interrogator for reading data from a device having any of the above features, the interrogator including a signal generator for applying an interrogation signal to the device and a receiver for receiving a response to the interrogation signal and for analysing the signal in order to determine which of the resonant members in the device vibrate.

It further extends to programming apparatus for a memory device having any of the above features, the apparatus including means for disabling selected ones of the restraining elements dependent on the data to be recorded.

The present invention also relates to methods of using and fabricating the above devices, and, viewed from a further aspect, the present invention provides a method of recording data, the method including the step of providing a memory device in accordance with any of the above features, and the step of disabling a plurality of the restraining elements in the memory device in accordance with the data to be recorded.

The present invention also provides a method of fabricating a data carrier including the step of fabricating a device in accordance with any of the above features, and programming the device with data by disabling selected ones of the restraining elements.

Viewed from a further aspect, the present invention provides a data system including:

a memory device having a plurality of resonant members that are held against vibration by restraining elements, disablement of the restraining elements allowing associated resonant members to vibrate in response to an applied excitation signal in order to represent data; and an interrogator including a signal generator for applying the excitation signal to the device and a receiver for receiving a response to the excitation signal and for analysing the signal in order to determine which of the resonant members in the device vibrate.

Viewed from a still further aspect, the present invention provides an RFID system including:

a memory device having a plurality of resonant members that are held against vibration by restraining elements, disablement of the restraining elements allowing associated resonant members to vibrate in response to an applied excitation signal in order to represent data; and an interrogator including a signal generator for applying the excitation signal to the device and a receiver for receiving a response to the excitation signal and for analysing the signal in order to determine which of the resonant members in the device vibrate.

The present invention may provide programming apparatus for a memory device having a plurality of resonant members that are restrained from vibration by fusible tethers, the device including an addressable array for passing a fusing current through selected ones of the tethers, the apparatus including contacts for connecting with the addressable array and means for supplying current to the contacts associated with the tethers to be fused.

The present invention may further provide programming apparatus for a memory device having a plurality of resonant members that are restrained from vibration by tethers, the device including an ablation beam generator for generating an ablation beam for ablating selected ones of the tethers.

The present invention further provides a method of fabricating a memory device including the steps of forming, e.g. etching, a plurality of resonant members in a substrate, e.g. a dielectric or semiconductor substrate, such that the resonant members are prevented from vibrating by a plurality of restraining elements. Preferably, it includes the step of recording data in the device by disabling selected ones of the restraining elements.

Viewed from another aspect, the present invention provides a memory device including a plurality of resonant members, the resonant members having different resonant frequencies and being restrained against vibration by one or more tether elements, the tether elements being removable so as to allow the resonant members to vibrate at their resonant frequencies in response to an applied excitation signal.

Viewed from a further aspect, the present invention provides a memory device including a plurality of resonant members and an excitation circuit for vibrating the resonant members, the resonant members having different resonant frequencies and being restrained against vibration by one or more tether elements, the tether elements being removable so as to allow the resonant members to vibrate at their resonant frequencies in response to the excitation circuit when an excitation signal is applied to the device.

Viewed from another aspect, the present invention provides a memory device including a plurality of resonant members and a detection circuit associated with the resonant members, the resonant members having different resonant frequencies and being restrained against vibration by one or more tether elements, the tether elements being removable so as to allow the resonant members to vibrate at their resonant frequencies in response to an excitation signal applied to the device, and the resonant members changing a measurable characteristic of the detection circuit when vibrated at their resonant frequencies.

Viewed from a further aspect, the present invention provides a memory device including a plurality of resonant members that are configured to vibrate in response to ac current, the resonant members having different resonant frequencies and being restrained against vibration by one or more tether elements, the tether elements being removable so as to allow the resonant members to vibrate at their resonant frequencies in response to ac current induced in the device by an applied excitation signal.

Viewed from a further aspect, the present invention provides a memory device including a plurality of magnetic resonant members, the magnetic members having different resonant frequencies and being restrained against vibration by one or more tether elements, the tether elements being removable so as to allow the resonant members to vibrate at their resonant frequency in response to an applied excitation signal.

Viewed from a further aspect, the present invention provides a memory device including a plurality of resonant members, the resonant members having different resonant frequencies and being designed to vibrate in response to a Lorentz type force, the resonant members being restrained against vibration by one or more tether elements, the tether elements being removable so as to allow the resonant members to vibrate to vibrate at their resonant frequency in response to an applied excitation signal.

Viewed from a further aspect, the present invention provides a memory device including a plurality of resonant members, the resonant members having different resonant frequencies and being designed to vibrate under an electrostatic force, the resonant members being restrained against vibration by one or more tether elements, the tether elements being removable so as to allow the resonant members to vibrate to vibrate at their resonant frequency in response to an applied excitation signal.

Viewed from a further aspect, the present invention provides a memory device including a plurality of resonant members, the resonant members having different resonant frequencies and being designed to vibrate under a piezoelectric force, the resonant members being restrained against vibration by one or more tether elements, the tether elements being removable so as to allow the resonant members to vibrate at their resonant frequency in response to an applied excitation signal.

Viewed from another aspect, the present invention provides a memory device including a plurality of resonant members formed by MEMS fabrication techniques, the resonant members being held against vibration by tethers, and the device being programmable by removing selected ones of the tethers.

Viewed from a still further aspect, the present invention provides an RFID device including a plurality of resonant members that are held against resonating vibration by tethers, the tethers being removable so as to record data in the device. The invention also extends to a system including such devices that have been programmed with identity data, and including an interrogator for applying an excitation signal to the devices to determine which of the resonant members of a device are able to vibrate, and a database in which is recorded information associated with the identity data.

Although discussed above in the context of resonant members and tethers, the present invention may extend to memory devices that do not incorporate these features.

For example, instead of using resonant members, the device could use movable members that could move between two positions on removal of a restraining element, so as to e.g. open or close a switch to alter a characteristic of a circuit. Thus, viewed from another aspect, the present invention provides a memory device including a plurality of movable members held in a first position against a biasing force by a restraining element, disabling of various of the restraining elements allowing the corresponding movable member to move under the biasing force to a second state in order to represent data. Preferably, the movable members are switches, and the second state is an open or closed state of the switch.

Various of the features discussed above are significant in themselves, irrespective of the use of tethers, and memory devices may be made using these features without the use of tethers. For example, coding may be achieved by only fabricating resonant members that have the desired resonant frequencies. Other coding methods would also be possible, e.g. by destroying resonant members of selected resonant frequencies.

Thus, viewed from a further aspect, the present invention provides a memory device including a plurality of resonant members and an associated excitation circuit for exciting the resonant members to vibrate in response to an excitation signal. It also extends to a memory device including a plurality of resonant members and an associated detection circuit, a measurable characteristic of the circuit changing in dependence on the vibration of the resonant members.

Further, the invention extends to a memory device including a plurality of resonant members for representing data, the resonant members being vibratable in response to ac current induced in the device.

The invention may provide a memory device including a plurality of resonant members that are vibrated by a Lorentz-type force. It may also provide a memory device including a plurality of resonant members that are vibrated by an electrostatic force. It may further provide a memory device including a plurality of resonant members that are vibrated by a piezoelectric force.

The use of a resonant member having a bridge form and side ethers is also a significant feature of the present invention, and, viewed from another aspect, the present invention provides a memory device including a plurality of bridge type resonant members that are held against vibration by one or more tethers along one or both of their sides.

It should be noted that any of the features of any of the above aspects may be applied to any of the other aspects.

Embodiments of the present invention will now be described, by way of example only, with reference to the accompanying drawings. It is to be understood that the particularity of the drawings does not supersede the generality of the preceding description of the invention.

Figure 1:
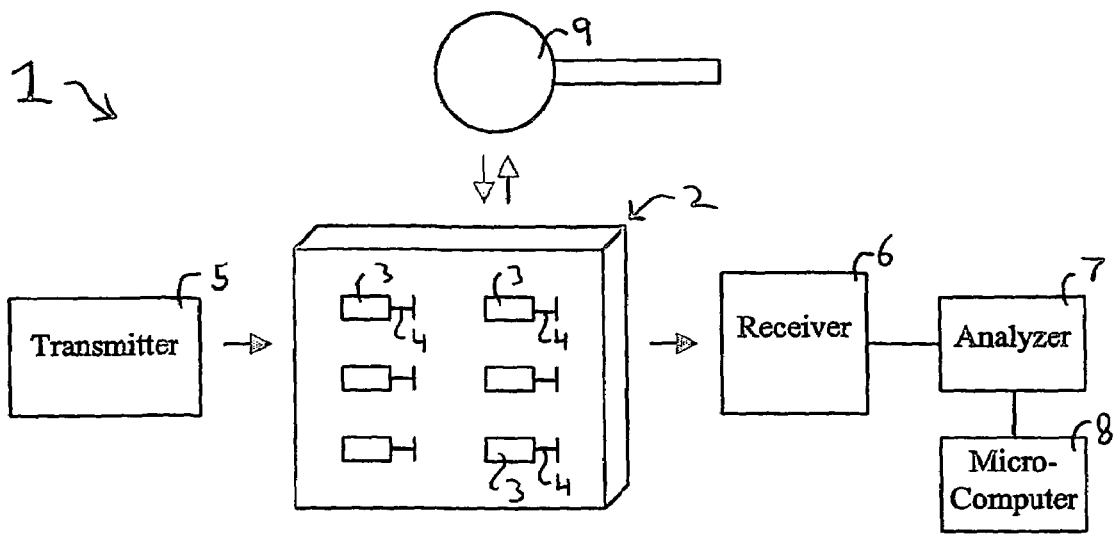
FIG. 1 is a schematic diagram of an RFID tagging system that may be implemented using the present invention.

Referring to FIG. 1, an RFID system 1 includes a memory device/RFID tag 2 that e.g. may be attached to an item to provide information about the item.

The tag 2 includes a plurality of resonant members 3 of differing resonant frequencies, which are initially held in a non-vibratable state by restraining elements, such as tethers 4. The tag 2 is programmed with data by placing a number of the resonant members 3 in a vibratable state through disablement of the restraining elements, e.g. through breakage/removal of the tethers 4 through laser ablation, fusing with an electrical current, etching or otherwise.

A resonant member 3 may represent for example a digital "1" or "0" depending on whether the resonant member 3 is free to vibrate or not.

The state of the resonant members 3 can be determined in any suitable manner. In the system shown, the state is determined by applying an excitation signal to the tag 2 and by detecting a response to or a disturbance in the excitation signal caused by the vibration of the untethered resonant members 3. This may be achieved for example by using a separate transmitter 5 and receiver 6 (together with a signal analyser 7 and microprocessor/database 8), or for example by using a single transceiver/interrogator device 9 that may e.g. take the form of a hand-held wand or the like.

The tag 2 has a number of advantages as an identification device. For example, it may be small and robust, and may be made simply and inexpensively, e.g. through the use of MEMS (microelectromechanical) technology.

Also, tags 2 of exactly the same fully-tethered (unprogrammed) form may be fabricated using the same manufacturing steps. The tags 2 may then be programmed in a final manufacturing step by removing selected tethers, so as to record whatever data is required in whatever coding manner is desired. The manufacturing process therefore requires very little alteration for the production of differently encoded devices, e.g. merely a change in a photo-mask pattern that protects selected tethers 4 from an ablating laser beam.

Furthermore, the present tags 2 can be less expensive than standard RFID tags that incorporate microprocessors. In the present system, the RFID tag 2 can be completely passive, with a tag reader incorporating the control and data-processing functions.

The tagging system may be used in place of barcodes, and has the advantage that it is not optically read, and so alignment with a reader is not as critical. For example, a tag reader need not require line-of-sight access.

In one application, the tags 2 may be placed on goods in a store or shop. They may for example be applied directly to the goods or to associated packaging. The store point-of-sale apparatus may then include a tag reader incorporating a transmitter 5 and receiver 6 or a combined transceiver 9, and items may be checked-through simply and easily without a cashier needing to correctly orientate a barcode over a scanning laser beam. A wand 9 may be used on the shop floor to identify stock for inventory checking or the like.

As the tag 2 may encode a relatively large amount of information compared with a barcode, it is able to record extra information over and above mere identification data. It may for example store attributes of the tagged item, e.g. information such as best-before dates and ingredients information, use information, control information and the like.

Similar advantages of ease of reading, a relatively large memory capacity and low cost, make the tagging system 1 applicable to many different situations. Applications include the general identification of people, animals, objects and locations, as well as tracking, monitoring, secure access, and control systems.

Figure 2:
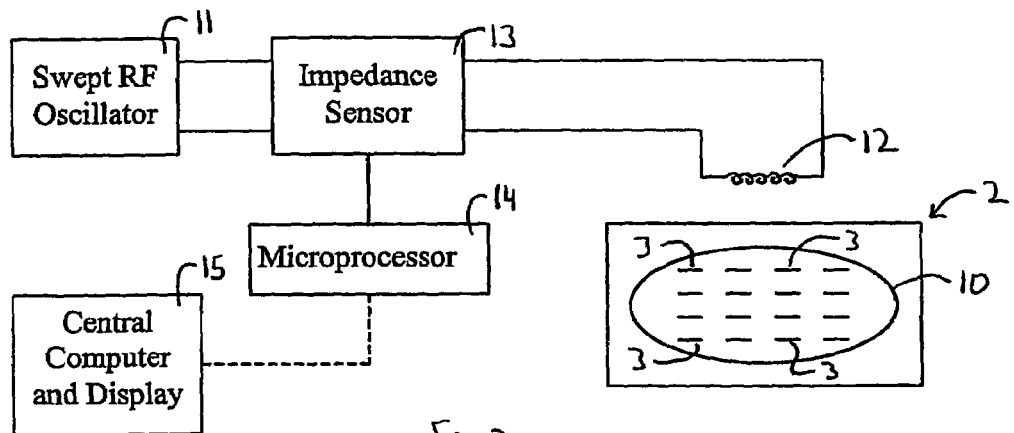
FIG. 2 is a schematic diagram of an RFID tag and handheld interrogator arrangement.

FIG. 2 shows a possible tag 2 and transceiver 9 arrangement, in which the tag 2 includes magnetic resonant members 3 and an excitation/indicator coil 10.

The transceiver 9 includes a swept RF oscillator 11, which generates an interrogation signal that is transmitted to the tag 2 via an antenna 12.

The coil 10 produces a time-varying magnetic field in response to the interrogation signal that vibrates an untethered resonant member 3 strongly when the magnetic force has a frequency corresponding to the resonant frequency of the resonant member 3. This vibration in turn alters the impedance of the coil 10, and the transceiver 9 includes an impedance sensor 13 that senses the impedance change.

The detected coil impedance is analysed with respect to excitation signal frequency by a microprocessor 14 to identify the resonant frequencies of the responding resonant members 3, and from these to determine the recorded data, e.g. identity data. This information may then be passed to a central computer 15 for suitable processing, e.g. the item may be looked-up or recorded in an associated database or the like.

Figure 3:
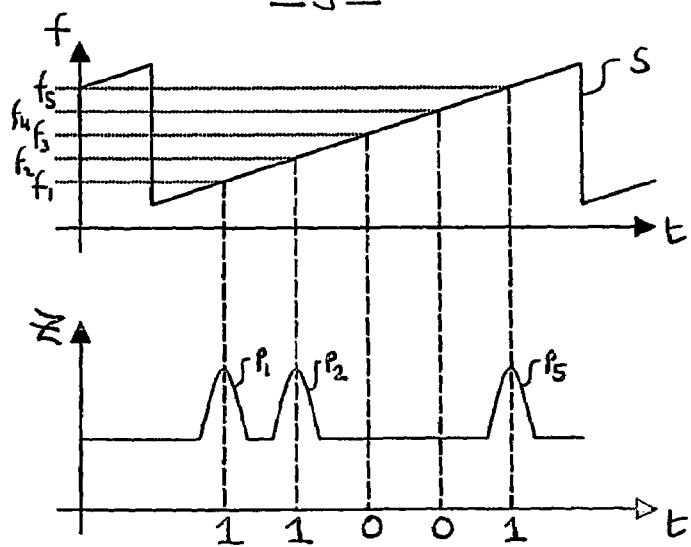
FIG. 3 is a graph representing an excitation signal applied by the interrogator of FIG. 2, and the resulting impedance signal from the RFID tag.

Possible interrogation and response signals for the tag 2 are shown in FIG. 3. As can be seen, the swept RF oscillator 11 applies an electromagnetic field signal S that sweeps through a range of sine wave frequencies in a saw-tooth manner. This swept range of frequencies includes the resonant frequencies of the resonant members 3.

Those of the resonant members 3 that have had their tethers 4 removed will resonate when the applied signal S corresponds to their resonant frequency, e.g. $f_1$, $f_2$ and $f_5$, and will cause a pulse $p_1$, $p_2$ and $p_5$ in the detected coil impedance.

The pulses $p_1$, $p_2$, $p_5$ may be associated with a logical "1", whilst the lack of a pulse at a known resonant member frequency, e.g. $f_3$ and $f_4$, may be associated with a logical "0". Thus, if the first two and the fifth resonating members 3 of the tag 2 are untethered and free to vibrate, then the device 2 may encode the data string "11001", as shown in FIG. 3.

This string may have any meaning attributed to it in the encoding system. It could for example be encoded data, or a set of flagged fields, or a combination of the two. Other data representation systems using the tethered/untethered states of the resonant members 3 are of course possible.

Figure 4:
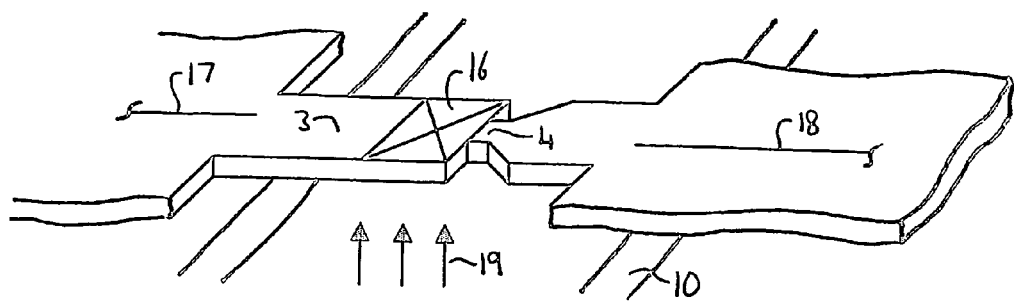
FIG. 4 is a schematic perspective view of a resonant member structure that may be used in an RFID tag of the present invention.

FIG. 4 shows one particular form of resonant member structure, which e.g. may be fabricated using MEMS technology, e.g. on a silicon substrate or the like.

In this embodiment, the resonant member 3 is of a cantilever construction and has a magnetic film 16, e.g. of Permalloy material, deposited on it.

The cantilevered member 3 is formed integrally with a tether 4 that is located at the cantilever's free end and is of narrower width than the cantilever 3.

The tether 4 may be removed by ablation from electromagnetic radiation, e.g. a laser beam, such as from an Excimer laser, or may be melted/vaporised by passing a suitably high fusing current through conductor strips 17 and 18 that are deposited on either side of the tether 4.

The conductor strips 17,18 may connect with an addressable array for allowing selected ones of the tethers 4 to receive the fusing current. Selective laser ablation of the tethers may be achieved by using a numerically-controlled narrowly-focussed laser beam or by using a broad beam and a photo-mask suitably patterned to protect the tethers of the resonant members 3 that are to remain tethered and to expose the tethers of those members that are to be released.

When untethered, the cantilever 3 will vibrate strongly if a magnetic field 19 produced by the coil 10 varies at a frequency corresponding to the resonant frequency of the cantilever 3. This vibration will vary the impedance of the coil 10, and the impedance change can in turn be monitored with respect to frequency to identify the untethered members 3.

Figure 5:
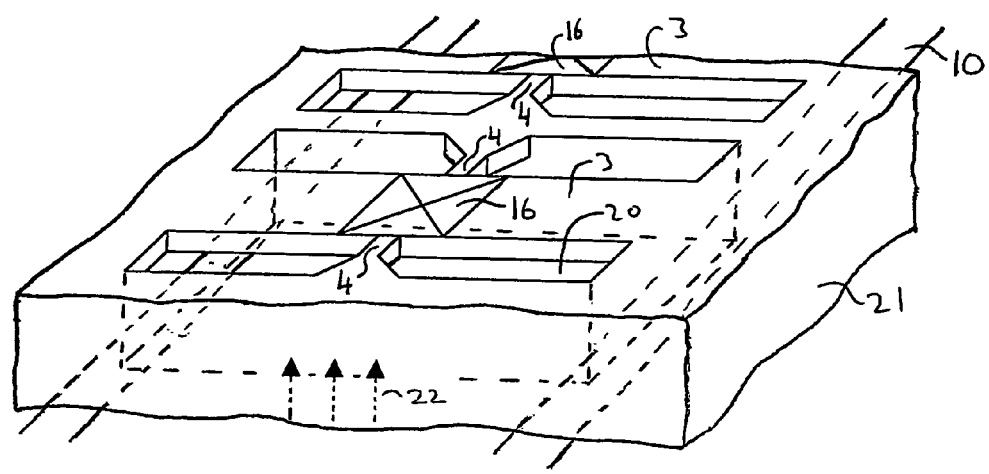
FIG. 5 is a schematic perspective view of another resonant member structure that may be used in an RFID tag of the present invention.

FIG. 5 shows a second embodiment, which is similar to the first embodiment, except that the resonant member 3 is in the form of a bridge member that is constrained at both of its ends and extends over a recess 20 (shown in phantom) in the substrate 21. Each resonant member 3 is tethered by two tethers 4, one to either side of the member 3 at the centre of the member. Both tethers 4 are removed, e.g. by laser ablation, in order to free the associated resonant member 3.

It should be noted that in order to vibrate a resonant member 3 as shown in FIG. 4 or 5 at its resonant frequency, the excitation field 22 needs to be at one half of the resonant frequency of the resonant member 3, e.g. of the cantilever or bridge member. If a DC bias field is applied to the members 3, then the excitation field 19 needs to be equal to the resonant frequency of the resonant member 3.

Figure 6:
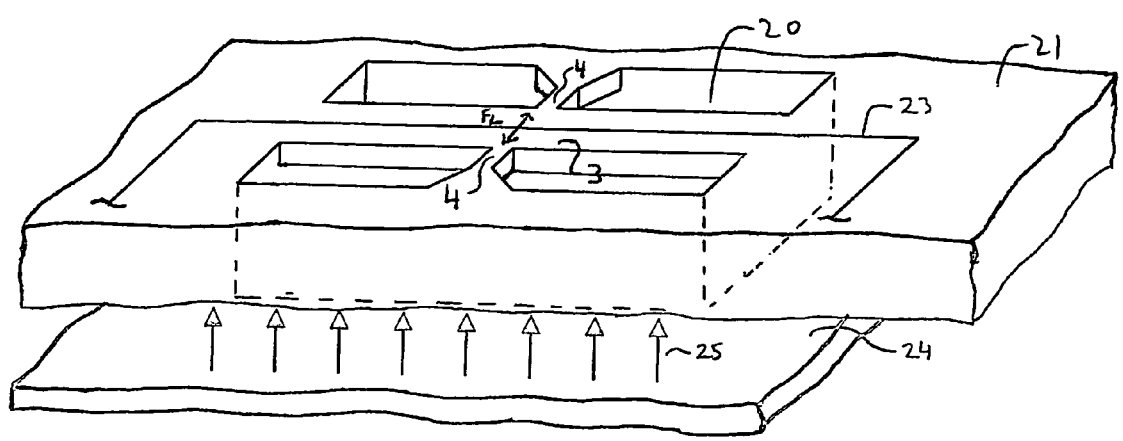
FIG. 6 is a schematic perspective view of a further resonant member structure that may be used in an RFID tag of the present invention.

FIG. 6 shows a third embodiment, which relies on the Lorentz force to vibrate the resonant member 3.

In this embodiment, the resonant member 3 is of a bridge-type construction, and is tethered similarly to the embodiment in FIG. 5 across recess 20. However, the resonant member 3 is not formed from magnetic material, and instead may be merely the silicon substrate of the device. Also, the member 3 has a conductor 23 extending along its length that is supplied with an alternating current, when the tag is being read. The current may be generated by an energization antenna, e.g. a coil, (not shown) that receives its energy from coupling with an applied excitation signal.

Further, the tag 2 is provided with a permanent magnet 24 that produces a constant magnetic field 25 orthogonal to the direction of current flow in the conductor 23. The permanent magnet 24 could for example be an alloy of Sm and Co, or an alloy of Nd, Fe and B, or an alloy of Pt and Co or Fe, amongst others. It could be replaced by an external magnetic field generated at the same time as the interrogation signal is applied to the tag.

Thus, when current flows through the conductor 23, the conductor experiences a Lorentz force $F_L$ according to the equation:

$$F_L = il \times B$$

where $F_L$ is the Lorentz force, l is the length of the resonant member, i is the current through the conductor, and B is the strength of the magnetic field 25.

This force $F_L$ acts in the tethered plane of the resonant member 3 (rather than transverse thereto as in the previous two embodiments), and the resonant member 3 will vibrate strongly when the frequency of the ac current in the conductor 23 corresponds to the member's resonant frequency.

In this case, in order for the resonant member 3 to vibrate at its resonant frequency, the excitation signal, i.e. the ac current frequency, needs to be equal to the resonant frequency of the resonant member 3.

The detection of the vibration of the Lorentz-type resonant members may be accomplished using suitable circuitry associated with the resonant members 3, which changes its characteristics, e.g. its impedance, when the resonant members 3 resonate. The circuitry may include the same conductors 23 and antenna circuitry that produces the excitation ac current. Thus, a detection system may apply a signal to the antenna to generate a suitable current in the conductors 23, and may monitor the driving impedance of the antenna to detect any changes in the impedance caused by a resonant member resonating to the driving signal.

Figure 7:
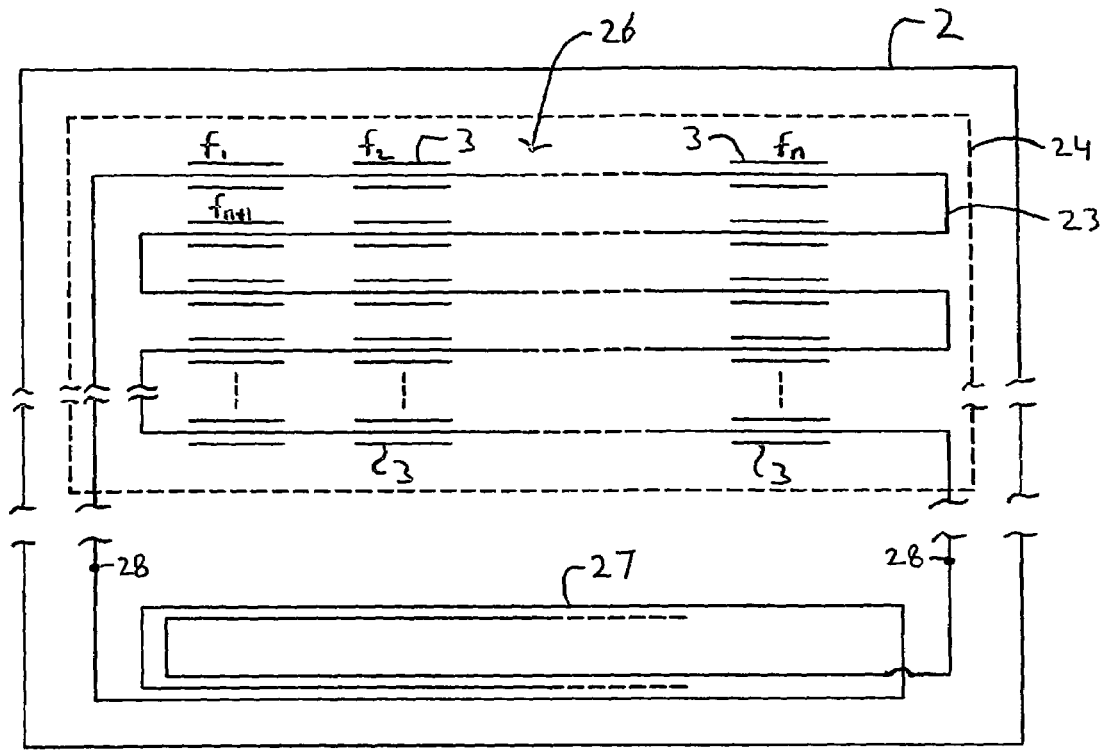
FIG. 7 is a schematic plan view of a tag using the resonant member structure of FIG. 6.

FIG. 7 shows one embodiment of a Lorentz force type tag 2 using resonant members 3 of the type shown in FIG. 6.

In this tag 2, the resonant members 3 are arranged in series into a number of rows to form an array 26 of n columns, each row having resonating members of n different frequencies, with for example 10,000 resonant members in total.

The array 26 is mounted above a permanent magnet 24, and a serpentine conducting strip 23 passes across each of the resonant members 3, and connects with an energizing/indicator coil 27 as the antenna.

The permanent magnet 24 and coil 27 may be provided on a separate substrate from the array 26, e.g. on a substrate below the substrate on which the array 26 and conductor 23 are formed. The coil 27 may then be suitably coupled to the conductor 23, e.g. at connection points 28.

In use, an applied excitation signal induces an ac current in the coil 27 that e.g. sweeps through the full range of resonant frequencies of the resonant members 3. The members 3 that are untethered resonate in response to their corresponding resonant frequency, and alter the impedance of the coil 27. The coil 27 is monitored to determine at which frequencies of the excitation signal its impedance changes sharply. The results can then be used to determine which of the resonant members 3 are untethered, and so can provide the corresponding data.

The results may for example be decoded into standard base-band logical "1"s and "0"s, which will be compatible e.g. with standard CMOS logic and the like. A logical "1" may be marked by a strong change in impedance at the known resonant frequencies of the resonant members 3, whilst a logical "0" may be marked by a negligible or no change in the coil impedance at the known resonant frequencies of the resonant members.

The resonant members 3 may be arranged in a series configuration, as shown in FIG. 7, or could be arranged in a parallel configuration, or in a combination of both.

Various forms of excitation signal may be used to interrogate the present RFID tags, e.g. a swept RF frequency signal (chirp), as in the FIG. 2 apparatus. Other interrogation methods may include spread spectrum techniques. These techniques may use e.g. pseudo (or periodic) random number (PRN) modulation signals, or e.g. may conduct random "frequency hopping".

Figure 8:
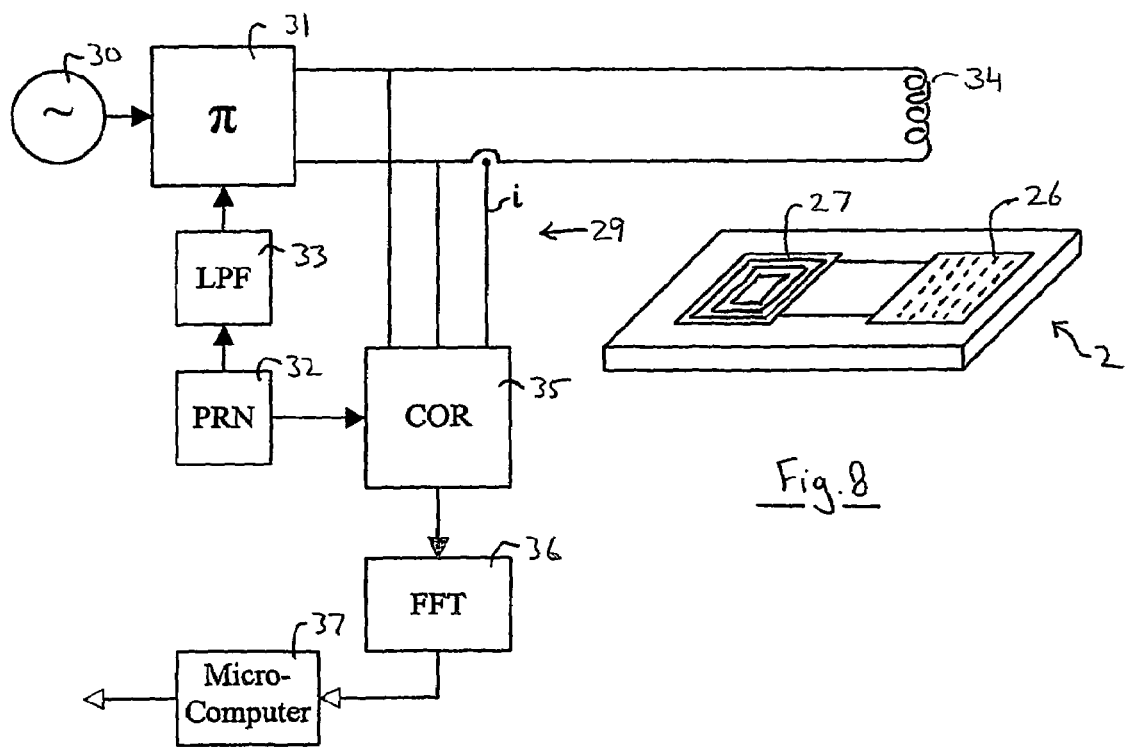
FIG. 8 is a schematic diagram of a tag and interrogator arrangement using the tag of FIG. 7.

FIG. 8 shows a transceiver 29 that may be used to interrogate the tag 2 of FIG. 7 using a pseudo random number (PRN) spread spectrum technique. Such interrogation systems would be understood by a person skilled in the art, and the "frequency hopping" technique can be implemented similarly, as would also be understood by a person skilled in the art. Both techniques provide information about the impedance of a tag 2 as a function of frequency, and both may provide enhanced immunity to ambient interference from electromagnetic noise, and so may give improved range for the tags when operating in a typical commercial or industrial environment.

The transceiver 29 of FIG. 8 includes an RF carrier signal oscillator 30 and a modulator 31 for modulating the carrier signal with a band-limited white noise signal generated by a PRN white noise source 32 and LPF band-limiting filter 33. The modulated signal is applied to the tag 2 via an antenna 34, and the resulting change in impedance of the indicator coil 27 in the tag 2 is sensed via the antenna 34 by a correlator 35 that correlates the impedance signal with the applied noise signal. The correlator output is passed to a Fast Fourier Transform (FFT) spectrum analyser 36 to calculate the tag impedance as a function of frequency. This information is then sent to a microcomputer 37 to decode the stored tag data.

Other resonant member structures, as well as the magnetic and Lorentz force members mentioned above are also possible. For example, a cantilevered or bridge-type resonant member could be electrostatically excited, so that as it vibrates the capacitance between it and the substrate changes. If the potential across the electrodes oscillates at a frequency corresponding to the resonant frequency of the resonant member, the resonant member will vibrate strongly and the impedance of e.g. an indicator coil will change sharply. In this case, the oscillation of the potential across the electrodes should be one half the resonant frequency of the resonant member in order to provide resonant vibrations.

Figure 9:
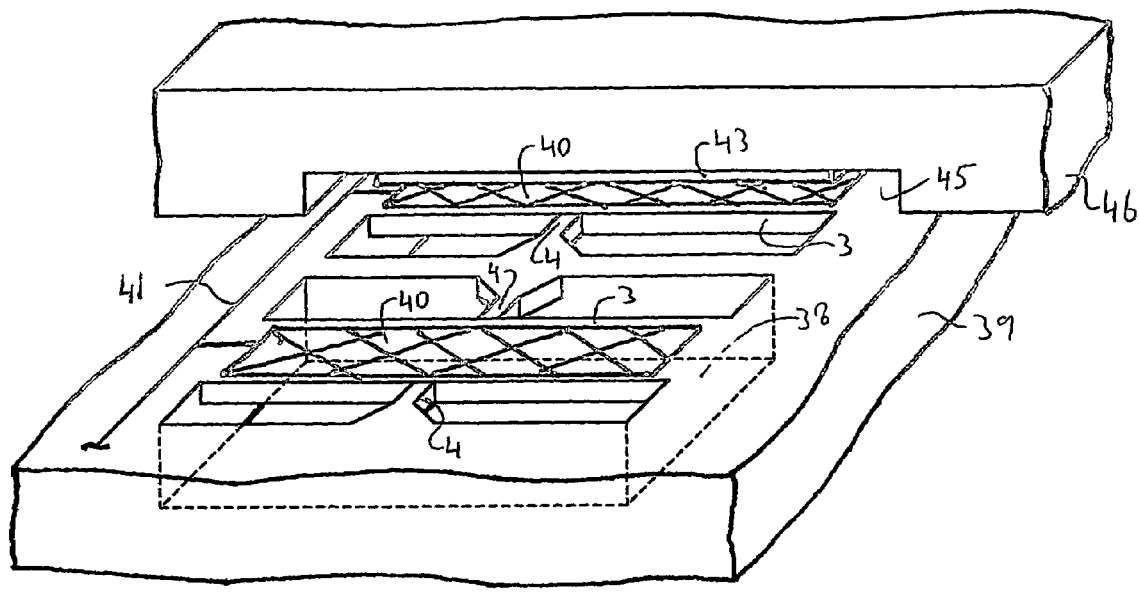
FIG. 9 is a schematic perspective view of a further resonant member structure that may be used in an RFID tag of the present invention, partially in cross-section.
Figure 10:
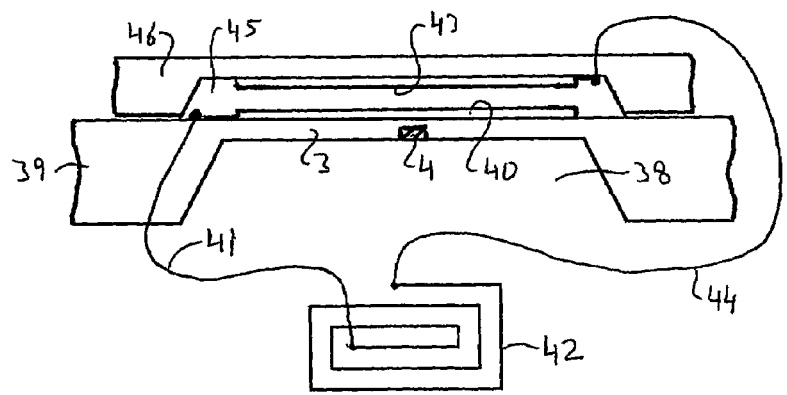
FIG. 10 is a schematic cross-sectional view of a resonant member structure such as is shown in FIG. 9.

FIGS. 9 and 10 show a possible arrangement for providing a device utilising electrostatic resonant members. In this embodiment, the resonant member 3 is provided as a bridge member extending across a recess 36 in a substrate 39 (the outline of the recess 38 being shown in phantom in FIG. 9). The bridge member 3 is held against vibration by a tether 4 on each of its sides towards the member's centre.

An electrode 40 of is provided on each bridge member 3, e.g. by a suitable deposition and etching process, and each electrode 40 is connected to a supply bus/rail 41 that connects with an excitation antenna (42 in FIG. 10), e.g. a coil.

Above each electrode 40 is a further electrode 43 that is connected to the other output of the excitation antenna, via a further bus or rail 44, so that the two electrodes 40,43 are capacitively coupled. The further electrode 43 may be mounted in a recess 45 located within a second substrate 46 that is provided above the first substrate 39, and is fixed in position.

When the energization antenna 42 is activated, e.g. by an RF interrogation field, an ac current is induced to flow through the buses 41 and 44. As the frequency of the RF field is altered, the current induced in the buses 41 and 44 changes frequency, and when the frequency corresponds to the resonant frequency of a resonant member 3, the current causes the resonant member 3 to vibrate strongly at its resonant frequency.

This reaction can be detected as a change in the driving impedance of the device's circuitry (the antenna, conductors and electrodes on the resonant members). Thus, a tag having the structure of FIGS. 9 and 10 can be read and utilised in a similar manner to the tag of FIG. 8.

As modifications/alternatives to the structure of FIGS. 9 and 10, the resonant members 3 could take the form of cantilevers rather than bridges, and the device could have a configuration including both forms. For example, in FIG. 9, the end of the bridge 3 distal from the electrical supply 41, could be free from the substrate 39. Also, the second, fixed, electrodes 43 could be formed as a single common electrode, rather than as a number of separate electrodes.

Further, the upper and lower electrodes 40,43 in FIGS. 9 and 10, could both be vibratable, i.e. the upper electrode 43 could be mounted on a resonant member, e.g. a bridge member, in a similar manner to the lower electrodes 40 of FIG. 9. The two opposed resonant members may have the same resonant frequency, in which case a more significant change in circuit character may occur at resonance. Alternatively, the two resonant members may have different resonant frequencies, and may both be tethered. This then allows the electrode pair to act as two bits of information, each electrode (and resonant member) representing one bit, rather than a pair of electrodes representing only one bit. This may for example provide a more compact device, in which the resonant member may be more densely packed, one set above the other.

The resonant members 3 of FIG. 9 are arranged so that their electrodes are connected in parallel. They could alternatively, however, be configured in series or in a combination of series and parallel arrangements.

Figure 11:
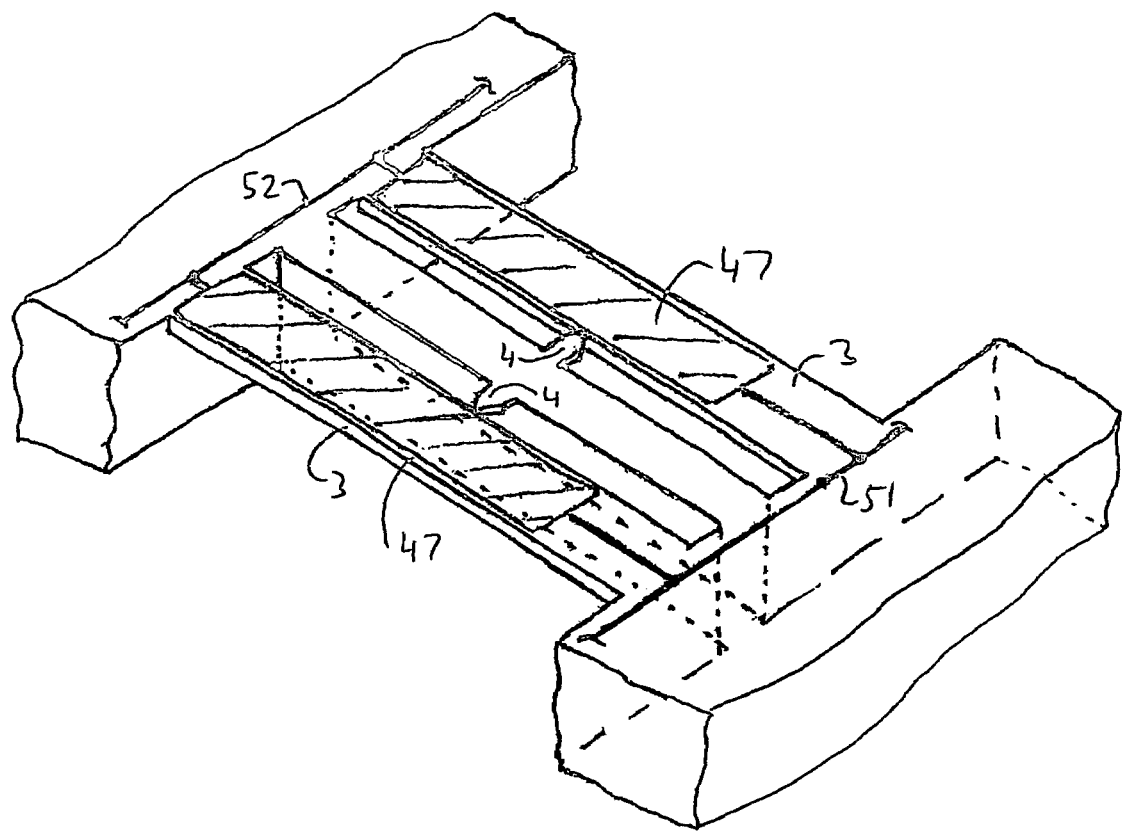
FIG. 11 is a schematic perspective view of another resonant member structure that may be used in an RFID tag of the present invention.
Figure 12:
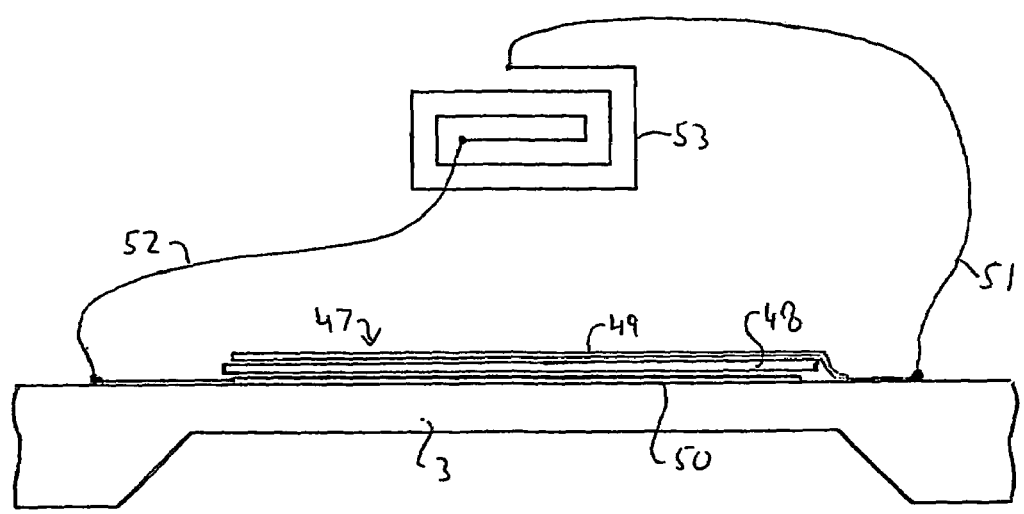
FIG. 12 is a schematic cross-sectional view of a resonant member structure such as is shown in FIG. 11.

FIGS. 11 and 12 show a further possible resonant member structure that utilising the piezoelectric force. In this embodiment, the resonant members 3 are again formed of bridge elements over a recess in a substrate, and the bridge elements are again centrally tethered.

A piezoelectric element 47, comprised of a layer of piezoelectric material 48, e.g. PZT (Lead Zirconate Titanate), between a pair of electrodes 49 and 50, is provided on the bridge element. Each electrode 49, 50 is connected to an electrical bus 51, 52 that connect with an energising antenna, such as a coil 53.

The piezoelectric material 48 is provided on a bridge element so that its polarising axis is transverse to the plane of the bridge element (i.e. it is oriented so that the electrodes 49,50 activate it in the d31 direction). Depending on whether the polarisation axis is pointed towards or away from the bridge element, and on the polarity of the electrodes 49, 50, the piezoelectric material 48 will either contract or expand in the direction of the length of the bridge element. This will cause the bridge element to bow either downwardly or upwardly, and the bridge element will resonate when the frequency of the piezoelectric force acting on the bridge element corresponds to the resonant frequency of the bridge element.

Again, therefore, detection of the vibration of the resonant members 3 can be determined from the impedance change of the coil 53 as it is driven at different energization frequencies. To vibrate a resonant member at resonant frequency, the energization frequency should be the same as the resonant frequency of the resonant member.

Various modifications and alternatives are possible in relation to the piezoelectric embodiment discussed above. For example, the bridge elements may be replaced by or used in combination with cantilever elements. Also, more than one piezoelectric element and electrode combination may be provided on a resonant member. For example, the resonant member may include piezoelectric material both above and below it, and the resonant member could be made as a piezoelectric bimorph having a pair of piezoelectric layers of material mounted together so as to have opposing polarisation directions, e.g. mounted on either side of a silicon substrate. Alternatively, the resonant member may include a plurality of piezoelectric and electrode layers on top of one another, e.g. to magnify the deflection.

The piezoelectric material may be provided to extend completely over the resonant member, or only partway across. It may be provided towards one end of the resonant member or towards the centre of the resonant member, without reaching either end. Preferably, the piezoelectric material extends along about 70% to about 75% of the length of the resonant member.

In all four of the above devices (i.e. using the magnetic, Lorentz force, electrostatic and piezoelectric resonant members), the tags/memory devices make use of a plurality of resonant members coupled with or included in circuitry within the device, so that the circuitry can excite the resonant members, and so that the vibration of the resonant members can be detected by a change in one or more characteristics of the circuitry, e.g. its impedance. This contrasts for example with a system in which no internal circuitry is provided, and in which an external field acts directly on the resonant members. This latter arrangement might occur e.g. when a magnetic resonant member is provided, in which case, an external interrogation signal may act directly on a magnetic resonant member and a signal may be detected directly from the movement of the magnetic resonant member.

In the case of embodiments using the Lorentz force, electrostatic forces and/or piezoelectric forces, the device can also be seen as including a plurality of resonant members that are activated by an ac current induced within internal circuitry of the device.

There are a number of ways that the tags of the present invention may be fabricated. MEMS technology is especially preferred. One MEMS fabrication method for a Lorentz force type tag, e.g. as in FIG. 7, is shown in FIGS. 13 to 16.

This fabrication process uses a silicon-on-insulator (SOI) wafer 135 that includes an insulating silicon dioxide layer 136 and a layer of silicon (111) 137.

Figure 13:
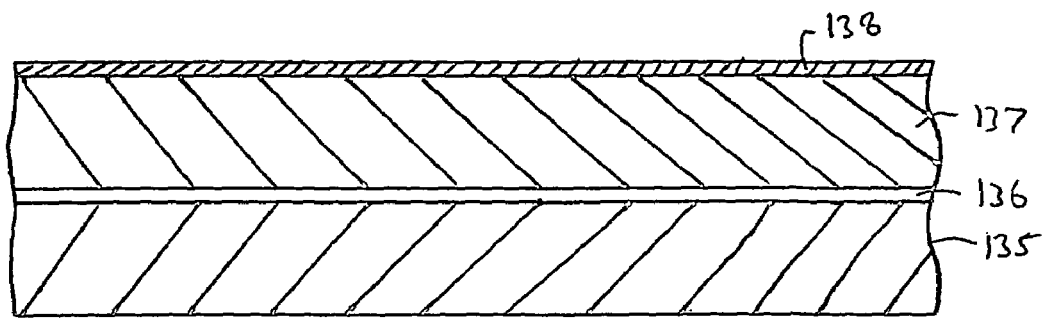
FIGS. 13 to 16 show schematically various stages in the fabrication of a tag such as shown in FIG. 7.

Firstly, as shown in FIG. 13, a layer of aluminium or copper film 138 is deposited (sputtered) on to the silicon (111) layer 137. The film 138 is then patterned using standard photolithography techniques to provide the serpentine conductor 23 of FIG. 7. This conductor 23 will lie along the tops of the resonant members 3.

Figure 14:
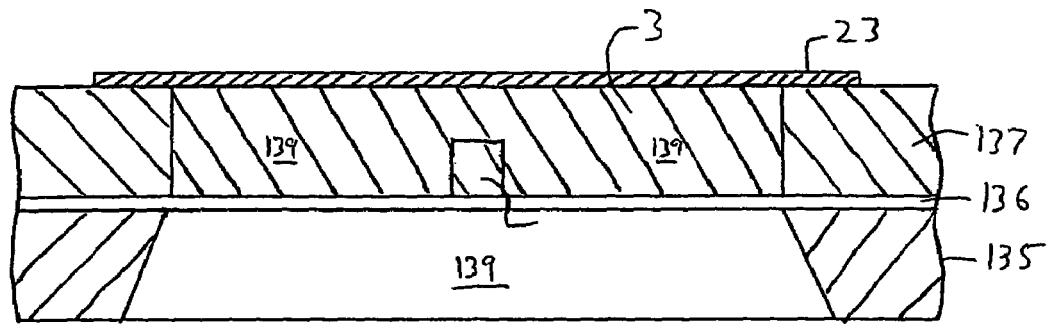

Next, as shown in FIG. 14, trenches 139 are etched into the SOI wafer 135 from both sides of the silicon dioxide layer 136 using KOH etch. These trenches 139 remove wafer material from below the silicon dioxide layer 136 in accordance with a first mask, and remove wafer material above the silicon dioxide layer 136 in accordance with another mask that defines the resonant beams 3 and the tethers 4 across the wafer. In FIG. 14, trenches 139 are shown in front of the beam 3, either side of the tether 4.

To obtain the tethers 4, the tethers are photo-masked and KOH is used to anisotropically etch the trenches 139 for a short period. After this, the photo-mask over the tethers is removed, and the KOH etch is continued with until the trenches 139 reach the silicon dioxide layer 136. As the etch rate is constant, the tethers 4 accordingly result.

Figure 15:
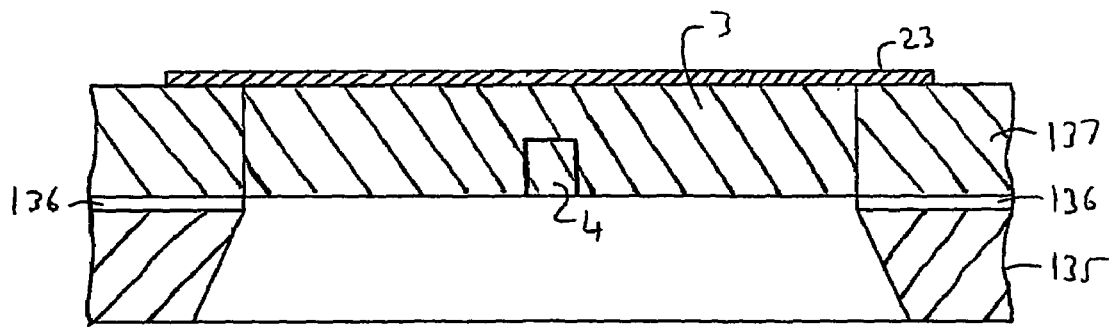

After forming the trenches 139, the silicon dioxide layer 136 is etched away using buffered HF, as shown in FIG. 15, to release the beam 3 on the underside (although it is still tethered).

Figure 16:
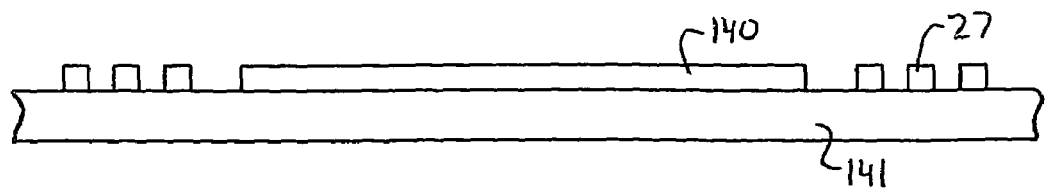

As shown in FIG. 16, a permanent magnetic material 140 is deposited onto the surface of a second substrate 141, and the coil 27 e.g. of electrodeposited copper is also applied to the substrate 141. As before, the permanent magnetic material may be an alloy of Sm and Co, or an alloy of Nd, Fe and B, or an alloy of Pt and Co or Fe, amongst others. The substrate may be of any standard PCB material, or could be of alumina or glass, or bakelized papers, amongst others.

The beam structure of FIG. 15 is then flip-chip bonded onto the substrate 141 of FIG. 16 to form the tag 2. Typically a large number of tag structures will be bulk formed on the substrates 135 and 141, and after bonding of the substrates, they will be diced to provide the individual tags, which may then be further processed as desired, e.g. embedded into larger tag supports or the like.

The above steps will generally include various sub-steps. For example, each step may require one or more photolithography steps, and each plating step may require a deposition of a plating base. These techniques will be well understood by a person skilled in the art.

The device is preferably fabricated so that the resonant members vibrate in a vacuum. This facilitates a high quality factor Q, which in turn facilitates a large change in impedance at resonance. It also facilitates the use of resonant frequencies in the range of about 1 MHZ to 2.5+GHZ. The high frequencies facilitate the use of resonant members of small physical size, so as to provide a large number of stored bits or the like.

Alternative fabrication procedures may also be used. For example, the conductors 23 may be used as the tethers. In this embodiment, the trenches 139 may first be KOH etched, and then an isotropic etch may be used to remove the silicon under the conductor 23, which acts as the tethers. This approach is suited to the use of fusible tethers, as the conductor would act as a common return path for the fusing currents. In this case, two conductors may be provided per resonant member, so that one remains to provide the Lorentz force, or the resonant member could include magnetic deposits, so as to provide a magnetic response rather than a Lorentz one. Other methods, including the use of polymers, such as polyimide, photo-resists could also be used.

The fabrication processes for the electrostatic and piezoelectric resonant members as shown in FIGS. 9 to 12 are similar to those of the Lorentz device discussed above.

The electrodes of the electrostatic embodiment may for example be made of gold/chrome or copper/titanium and may be vapour deposited on the cantilevers or bridge elements of a silicon substrate and then suitably patterned by etching.

The piezoelectric material, e.g. PZT, may be deposited using a sol gel, and the electrodes deposited using vapour deposition. Standard techniques may be used to ensure good adhesion between the electrodes and the silicon beams and PZT, e.g. using adhesive layers.

The suspended beams and/or cantilevers may for example be machined from single crystal silicon.

As previously mentioned, once a fully tethered tag 2 is produced, the tag 2 may be suitably programmed by releasing selected ones of the resonant members 3 by ablating or fusing their associated tether or tethers 4.

Ablation is most preferred in manufacturing processes where many identical tags are produced. Thus, a suitably patterned photo-mask can be formed and aligned over the etched fully-tethered tag, and the whole tag may then be exposed to a suitable ablation beam, e.g. an Excimer laser, to ablate and remove the unmasked tethers in a parallel manner.

The process of laser ablation may be similar to standard photolithography techniques, e.g. as used in the microelectronics industry, and would be well understood by a person skilled in the art. Instead of visible light, the method may use UV light from an Excimer laser, and so the masks are made from UV transmitting glass. A typical mask would appear opaque over its surface except where small windows are provided to allow the UV to be transmitted to ablate the selected tethers.

As previously mentioned, fusing of the tethers 4 by a suitably high fusing electrical current is also possible. The fusing of the tethers 4 by an electrical current has particular advantages in programming a tag in the field, as the equipment required may be simple and low-cost and easily transportable.

Figure 17:
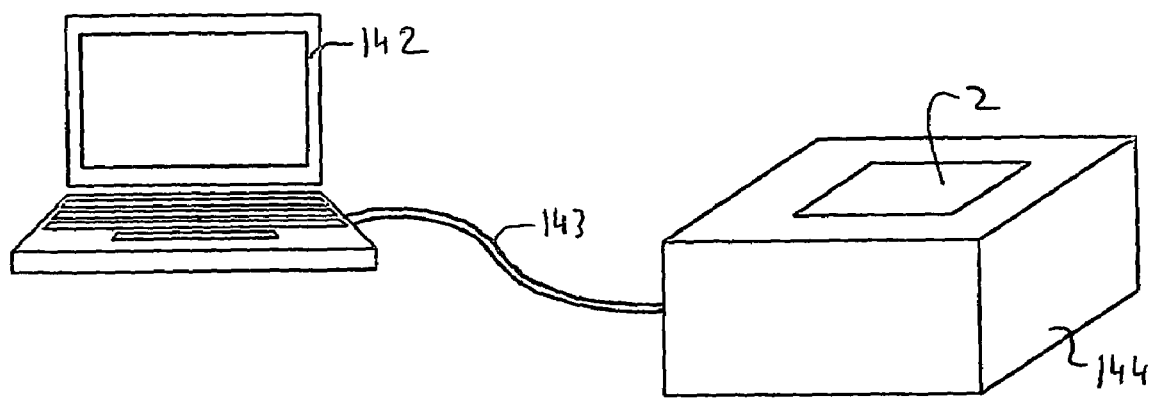
FIG. 17 is a schematic diagram of an RFID tag being programmed in the field.

FIG. 17 shows a possible field programming system, incorporating a portable, e.g. laptop, computer 142 connected by a suitable lead 143 to a programming unit 144 in which a tag 2 is mounted. The programming unit 144 will include a plurality of electrical contacts for connecting with an addressable electrical array in the tag 2.

The computer 142 will run software that encodes the information to be stored into logical data that can be represented by the tethering or untethering of the tag resonant members 3. The computer 142 will then instruct the programming unit 144 as to which tethers to fuse, and the programming unit 144 will supply current to the appropriate contacts to provide a short current pulse to the corresponding array addresses so as remove the tethers in a serial manner. The tethers 4 which receive the current pulses will vaporise leaving their associated resonant members 3 free to vibrate.

It is to be understood that various alterations, additions and/or modifications may be made to the parts previously described without departing from the ambit of the present invention, and that, in the light of the teachings of the present invention, the memory device/data carrier may be implemented in a variety of manners as would be understood by the skilled person.

In one alternative embodiment, the resonant members may be replaced by movable members that are held against a bias force by the tethers so that when the tethers are removed, the members move under the bias force to open or close an associated circuit. The impedance of the circuit may then be detected to determine the state of the members, and so the stored code. The biasing force could be provided by spring means, or by pretensioning the members during fabrication. Such techniques are disclosed in the co-pending International (PCT) Patent Application entitled "Temperature Sensing Devices, Systems and Methods" filed on the same day as the present application and claiming priority from Australian Provisional Patent Application NO. 2003901253 filed on 17 Mar. 2003. The contents of this International application are incorporated herein by reference.

Also, although the tethers are found to be particularly useful, the present invention may cover designs in which only resonant or movable members of required frequencies are formed, so that e.g. the "0" in e.g. "1101" is encoded by not fabricating a resonant or moving member at the third frequency of a predetermined sequence of frequencies. It would also be possible to provide a plurality of freely vibratable resonant members of different resonant frequencies, and then destroy selected ones of the members to encode the device. The above various excitation and detection methods and resonant member types would still be applicable and provide advantages in such designs.

For example, the use of an internal circuit in the memory device to excite and/or detect the vibration of a resonant member is useful in itself, as is the use of resonant members that vibrate in response to the application of an ac current. Further, the use of Lorentz, electrostatic or piezoelectric forces to vibrate the resonant members are also significant in themselves.

Instead of using resonant members of differing resonance, members of the same resonance could be used, and the strength of the response to an excitation signal could be used to determine the number of members that are untethered. This would however allow only a limited range of data values to be recorded.

It will be understood that as well as resonating at a fundamental resonant frequency, the members may be made to resonate in response to a harmonic frequency of the fundamental frequency.

The invention claimed is:

1. A memory device including an array of bridge-type resonant members adapted to vibrate in response to an applied Lorentz force in order to represent data, wherein a common electrical conductor extends along the lengths of a plurality of resonant members in the array and forms part of excitation circuitry for coupling with an applied excitation signal and causing vibration of the resonant members.

2. The memory device of claim 1, wherein the resonant members are held against vibration by restraining elements, disablement of the restraining elements allowing associated resonant members to vibrate in response to an applied Lorentz force.

3. The memory device of claim 2, wherein the restraining elements are provided at the sides of the resonant members.

4. The memory device of claim 3, wherein the restraining elements are fusible, and wherein the device includes fusing circuitry for passing a fusing current through the fusible restraining elements, the fusing circuitry including an addressable array for fusing individual restraining elements.

5. The memory device of claim 3, wherein the restraining elements are configured to be removable by ablation.

6. A method of recording data on a memory device according to claim 2, the method comprising disabling restraining elements in the memory device in accordance with the data to be recorded.

7. The memory device of claim 1, wherein the resonant members have different resonant frequencies from one another.

8. The memory device of claim 1, including detection circuitry associated with resonant members, such that a characteristic of the circuitry is changed due to vibration of the resonant members.

9. The memory device of claim 1, wherein the electrical conductor takes a serpentine form.

10. The memory device of claim 1, wherein the memory device is fabricated using MEMS technology.

11. The memory device of claim 1, wherein the resonant members are formed on a dielectric or semiconductor substrate.

12. The memory device of claim 11, wherein the excitation circuitry is fabricated on the same dielectric or semiconductor substrate.

13. An RFID device including the memory device of claim 1.

14. A data storage system including the memory device of claim 1, and an interrogator including a signal generator for applying an interrogation signal to the device and a receiver for receiving a response to the interrogation signal and for analysing the signal in order to determine which of the resonant members in the device vibrate.

15. The data storage system of claim 14, wherein the interrogation signal induces an alternating current in the electrical conductor, and wherein a magnetic element is provided in the memory device to provide a magnetic field across the resonant members orthogonal to the direction of current flow.

16. The data storage system of claim 14, wherein the interrogation signal induces an alternating current in the electrical conductor, and wherein the interrogator applies a magnetic field across the resonant members orthogonal to the direction of current flow.

17. The memory device of claim 1, wherein the excitation signal induces an alternating current in the electrical conductor.

18. The memory device of claim 17, wherein the excitation circuitry includes an antenna circuit, the alternating current being induced in the antenna circuit.

19. The memory device of claim 18, wherein the antenna circuit includes a coil.

20. The memory device of claim 19, wherein the resonant members change impedance when resonating based on vibration of the associated resonant members.

21. The memory device of claim 19, wherein the excitation circuitry, including the coil, and the resonant members are fabricated on the same substrate.

22. The memory device of claim 1, including a permanent magnetic element for providing a magnetic field across the resonant members.

23. A method of reading data recorded on the memory device of claim 1, including the steps of:

applying an interrogation signal to the memory device so as to cause the associated resonant members to vibrate, receiving a response to the interrogation signal, and analysing the response in order to determine which of the resonant members in the device vibrate.

24. The method of reading data of claim 23, wherein the interrogation signal induces an alternating current in the electrical conductor, and wherein a magnetic element is provided in the memory device to provide a magnetic field across the resonant members orthogonal to the direction of current flow.

25. The method of reading data of claim 24, wherein the magnetic field is applied by an external field applied at the same time as the interrogation signal.

26. The method of reading data of claim 23, wherein the interrogation signal induces an alternating current in the electrical conductor, and wherein the step of applying an interrogation signal to the memory device includes applying a magnetic field across the resonant members orthogonal to the direction of current flow.

27. The memory device of claim 3, in which a plurality of restraining elements have been disabled, so as to encode the device with data.

* * * * *